United States Patent [19]

Poff et al.

[11] 4,094,332

[45] June 13, 1978

[54] EARTHQUAKE-RESPONSIVE FUEL SHUT-OFF DEVICE

[76] Inventors: Joseph F. Poff; Jerry W. Poff, both of 89 Bishop Rd., Crockett, Calif. 94525

[21] Appl. No.: 731,362

[22] Filed: Oct. 12, 1976

[51] Int. Cl.² .............................................. F16K 17/36
[52] U.S. Cl. ........................................ 137/46; 251/25; 251/61.1
[58] Field of Search .................... 137/38, 39, 45, 46; 251/25, 61.1

[56] References Cited

U.S. PATENT DOCUMENTS

| | | | |
|---|---|---|---|
| 2,637,331 | 5/1953 | Sullivan | 137/39 |
| 2,665,710 | 1/1954 | McGarry | 251/61.1 X |
| 3,043,321 | 7/1962 | Hewitt | 137/46 |
| 3,078,066 | 2/1963 | Moore | 251/61.1 |
| 3,783,887 | 1/1974 | Shoji | 137/38 |

*Primary Examiner*—Robert G. Nilson
*Attorney, Agent, or Firm*—Warren, Chickering & Grunewald

[57] ABSTRACT

A master valve adapted for insertion in a fuel line to be controlled and a fluid-pressure-responsive actuator responsive to fuel line pressure for maintaining the valve in open position against the resistance of a valve-closing spring; and a normally closed earth-movement-responsive auxiliary valve connected to the fuel line and the aforesaid actuator and functioning in response to a predetermined minimum severity earthquake to open the auxiliary valve and equalize the pressure in the actuator to effect closing of the master valve by its closing spring.

6 Claims, 5 Drawing Figures

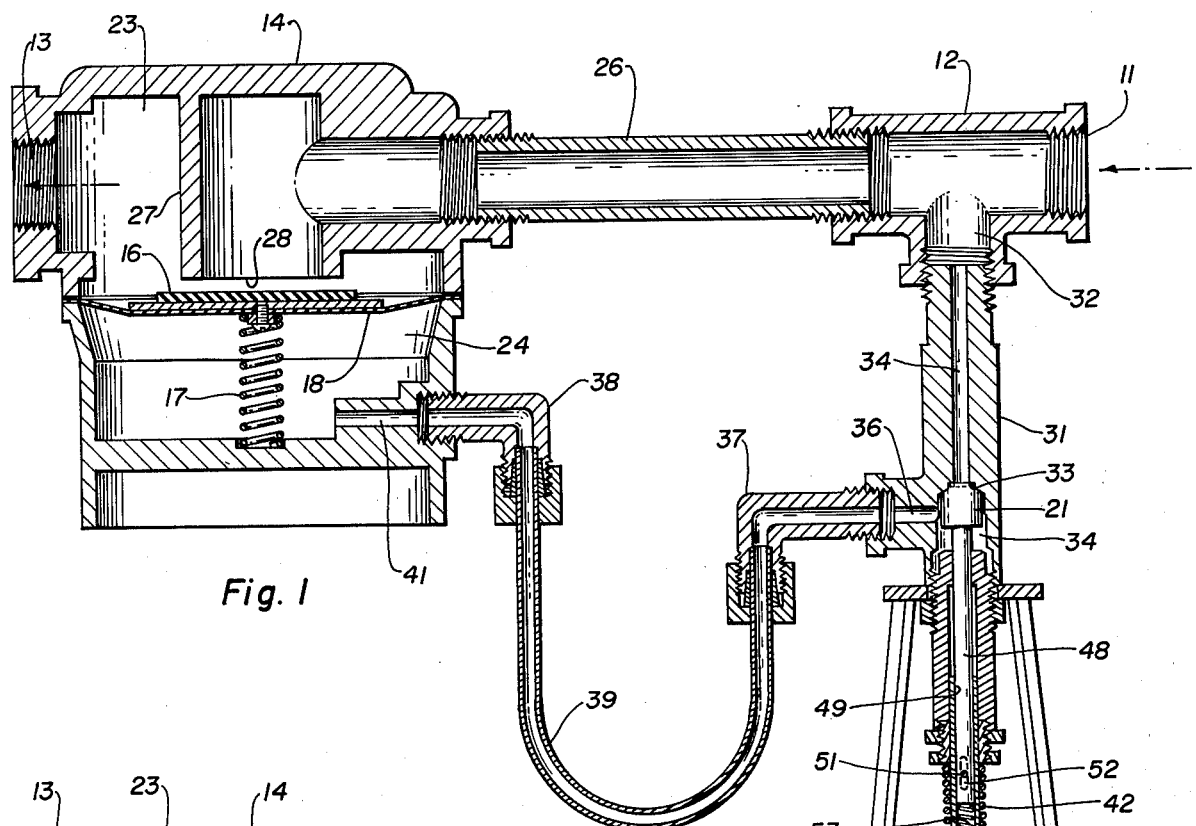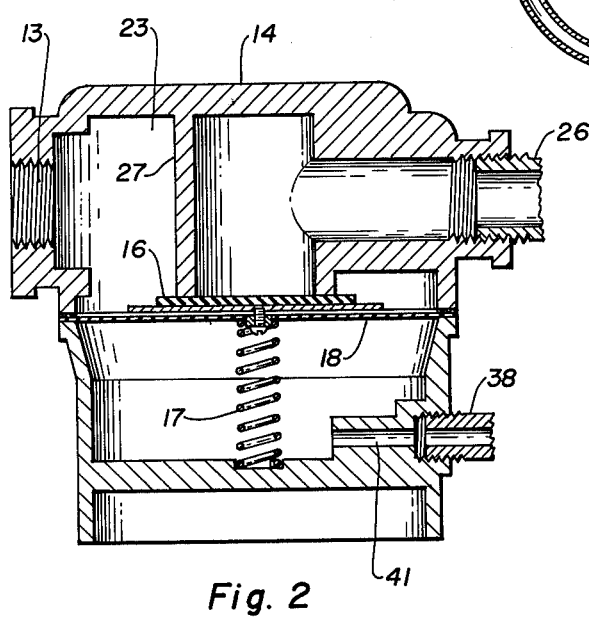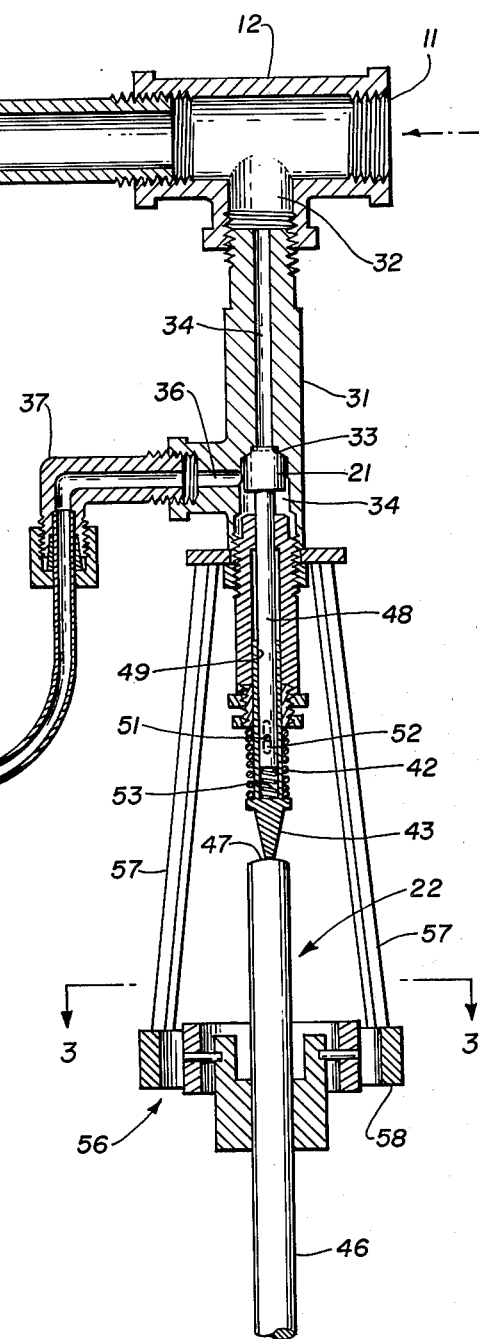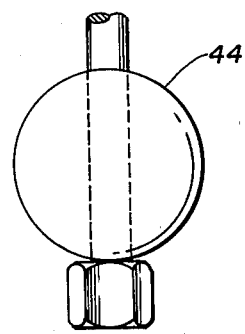
Fig. 1
Fig. 2

EARTHQUAKE-RESPONSIVE FUEL SHUT-OFF DEVICE

BACKGROUND OF THE INVENTION

In severe earthquakes one of the greatest causes of damage is fire, aggravated by the rupturing of fuel lines and uncontrolled escape of readily combustible fuel. The invention relates to valves which may be inserted in such fuel lines, particularly adjacent the entrance of such lines into buildings and to earthquake-responsive mechanisms which will effect a closure of the valve when subjected to a predetermined minimum severity earthquake. Examples of earlier attempts to provide such mechanisms are disclosed in U.S. Pat. Nos. 2,054,563; s,158,753; 2,229,543; 2,615,461; and 2,873,753.

SUMMARY OF INVENTION

The earthquake-responsive fuel shut-off device of the present invention functions on a combination of a master valve inserted in the fuel line and normally held open against a valve-closing spring by a line-pressure-operated actuator, a normally closed auxiliary valve connected to the fuel line and the actuator and functioning when open to equalize or de-energize the actuator for closing of the master valve by its closing spring and an earth-movement-responsive device for opening the auxiliary valve. By such a construction the controlling of a small auxiliary valve will effectively control a large master valve shutting down the system. The forces required to operate the small valve are correspondingly low, enabling the system to function with precision, sensitivity and dependability which wuld otherwise be difficult, if not impossible, of attaining in structures where the earth-movement-responsive means had to itself generate enough power to control directly the operation of the master valve.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

BRIEF DESCRIPTION OF THE DRAWING

FIG. 1 is a vertical cross-sectional view of an earthquake-responsive fuel shut-off device constructed in accordance with the present invention.

FIG. 2 is a cross-sectional view of a portion of the mechanism illustrated in FIG. 1, but shown with the parts in a different position.

DETAILED DESCRIPTION OF INVENTION

Figure 4:
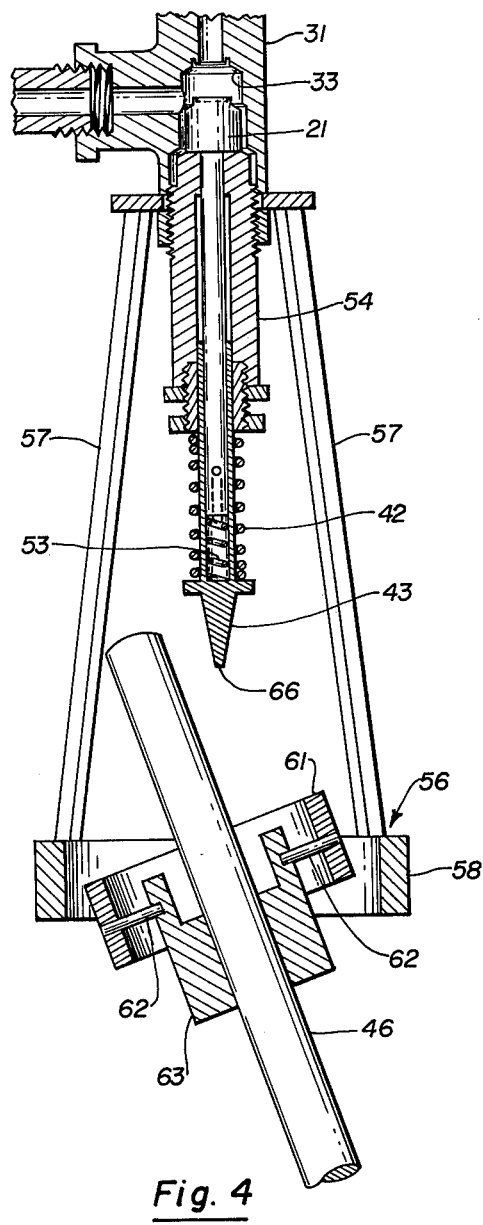
FIG. 4 is a cross-sectional view of a portion of the mechanism shown in FIG. 1, but with the parts in a different position.
Figure 3:
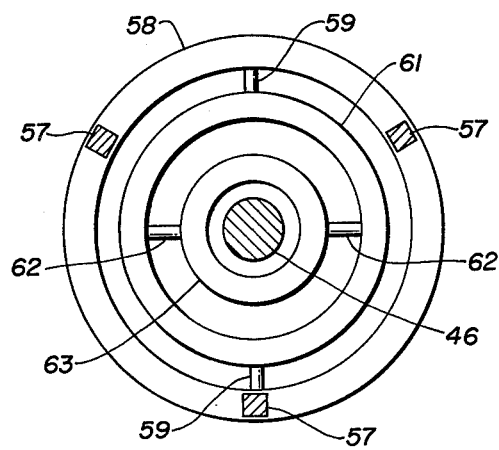
FIG. 3 is a cross-sectional view of the mechanism taken substantially on the plane of 3—3 of FIG. 1.

The earthquake-responsive fuel shut-off device of the present invention is adapted for insertion into a fuel supply line connected to a fuel source under pressure, the upstream fuel line being connected to a threaded opening 11 in a pipe T 12 and the downstream fuel line being connected in a threaded opening 13 in a master valve housing 14. The apparatus comprises, briefly, a master valve 16 mounted in housing 14 and normally held open against a valve-closing spring 17 by an actuator, here diaphragm 18, by a fuel-line-imposed pressure differential; a normally closed auxiliary valve 21 which is connected to the fuel supply line and to actuator 18 and functioning when open to de-energize actuator 18 to cause closing of valve 16 by spring 17; and earth-movement-responsive means 22 for controlling the opening of valve 21 when the apparatus is subjected to a predetermined minimum severity earthquake.

As will be observed from FIG. 1, diaphragm 18 divides housing 14 into an upper chamber 23 and a lower chamber 24. The main fuel flow line extends from T 12 through conduit 26 into the upper chamber 23 for continuing its passage via opening 13 in chamber 23 to the fuel appliances in an adjoining building. A central interior wall 27 within chamber 23 defines a flow passage and a circular valve seat 28 juxtaposed to a central portion of diaphragm 18 which, in turn, carries valve 16 which is movable with diaphragm 18 to and from seat 28. Fuel pressure in chamber 23 will cause displacement of diaphragm 18 away from seat 28, thus opening valve 16 for normal continuous fuel supply to opening 13. Spring 17 is here mounted in lower chamber 24 and resists the aforementioned pressure displacement of diaphragm 18. Finally, it will be noted that the auxiliary fuel supply line controlled by valve 21 is connected to lower chamber 24. Hence, when valve 21 is open, fuel line pressure will build up in chamber 24, equalizing the pressure on opposite sides of diaphragm 18, thereby producing a displacement of valve 16 to seat 28 under the urge of spring 17, effectively shutting down fuel flow in the fuel supply line.

Valve 21 is here mounted within a valve housing 31, here connected to T stem passage 32, valve 21 being mounted for reciprocation to and from a valve seat 33 formed at one end of fuel passage 34 extending longitudinally through housing 31 and connected to the main fuel line. Valve 21 is mounted in a chamber 34 having a discharge passage 36 here connected by fittings 37 and 38 and conduit 39 to a fuel inlet passage 41 formed in master valve housing 14 leading into lower compartment or chamber 24. Movement of valve 21 away from its seat, i.e., to open position, will connect the fuel supply line to lower compartment 24 to effect shutting down of the fuel supply, as above explained. Opening of valve 21 is here controlled by a valve opening spring 42, which is normally hold in a compressed, energized position by member 43, which is, in turn, supported by earth-movement actuator 22. The latter here comprises a pendulum composed of a pendulum weight 44 suspended at the bottom of a free-swinging pendulum arm 46, having its upper end 47 in supportive contact with member 43 in the normal vertical position of arm 46, as illustrated in FIG. 1. In response to a predetermined minimum severity earthquake, the pendulum will swing to one side, as illustrated in FIG. 4, thereby disengaging part 43 and permitting spring 42 to displace valve 21 to open position.

As will be observed from FIG. 1, valve 21 is here structured for vertical reciprocation to and from its closed position on seat 33 and is formed with a vertically depending stem 48 having a longitudinal axis coincident with the undisturbed vertical axis of arm 46. Stem 48 is here mounted within an actuator sleeve 49, having its lower end terminating in member 43, and is connected to the sleeve by a loss-motion connection composed of a pin 51 carried by stem 48 and mounted in opposed elongated slots 52 in the sleeve. A small helical spring 53 is compressed between the lower end of stem 48 and member 43 so that with member 43 supported on pendulum arm end 47, as illustrated in FIG. 1, valve 21 will be resiliently pressed against seat 33 and pin 51 will be medially disposed in slots 52. Upon release of member 43 by pendulum end 47, as illustrated in FIG. 4, member 43 will be driven downwardly by spring 42, and after a small lost motion, will abruptly pick up and drive downwardly valve stem 48, opening valve 21. In this operation it will be noted that spring 42 is mounted in compression between member 43 and a tubular extension 54 of auxiliary valve housing 31 and functions to override the substantially lighter spring 53.

Pendulum arm 46 is here mounted in a gimbal or universal joint 56 suspended from valve housing 31 by a plurality of depending arms 57 surrounding and generally symmetrical to the vertical axis of the assembly. The lower ends of arms 57 are connected to a stationary support ring 58, which is, in turn, connected by hinge pins 59 to an inner concentric ring 61, which is, in turn, hingedly connected by pins 62 to an inner concentric ring 63 secured to pendulum arm 46. In this assembly it will be noted that the hinge axes provided by pins 59 and 62 are at right angles, thus providing a universal support for the pendulum arm.

As a further feature of the present construction, the lower end 66 of member 43 is reduced to a small area for sliding support upon the end face 47 of the pendulum arm, thus permitting arcuate sliding displacement of end face 47 out of supporting contact with part end 66 when the pendulum is displaced from its vertical position, as seen in FIG. 4. Preferably, end face 47 is given a convex form to facilitate such sliding engagement.

Figure 5:
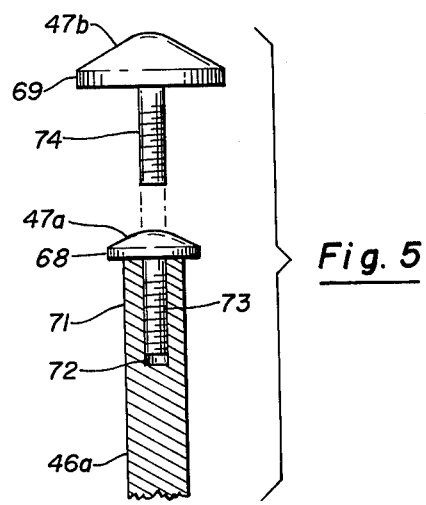
FIG. 5 is a fragmentary cross-sectional view of a modified form of the invention.

A modified form of the invention is illustrated in FIG. 5, wherein a plurality of members 68 and 69 are formed for interchangeable mounting on the upper end 71 of pendulum arm 46a to provide end faces 47a and 47b of different sizes functioning to release part 43 in response to earth movements of different severities. As will be observed from FIG. 5, the upper end portion 71 of pendulum arm 46a is formed with an axial threaded opening 72 and members 68 and 69 are formed with threaded stems 73 and 74, which may be interchangeably mounted in opening 72. The working end face 73b of member 69 is somewhat larger than the equivalent end face 47a of member 68 so that, with member 69 inserted in place on the pendulum arm, a somewhat greater displacement of the pendulum will be required to release part 43 to cause opening of valve 21.

In the closed position of valve 21, as seen in FIG. 1, passage 36 is vented through the clearances provided in the valve operating structure so as to, in turn, vent to the atmosphere the lower chamber 24 of master valve housing 14, thus providing in the normal operating condition of the device the fuel line pressure differential for maintaining valve 16 in open position.

What is claimed is:

1. An earthquake-responsive fuel shut-off device adapted for insertion in a fuel line connected to a fuel source under pressure comprising:

a main valve and a fluid-pressure-responsive actuator therefor maintaining said valve in fluid flow open position in response to a fuel-line-imposed pressure differential and including means biasing said valve to flow shut-off position in the absence of said differential;

means providing a fluid-line-connected passage to said actuator for placing said line pressure in opposition to and equalizing said pressure differential to effect closing of said valve by said biasing means;

a second valve in said passage movable between open and closed positions therein;

a spring urging said valve to open position;

a member having a position engaged with and supporting said valve in closed position against the urge of said spring; and an earth-movement-responsive actuator connected to and displacing said member from its said position in response to a predetermined minimum severity earthquake, thus permitting opening of said valve.

2. An earthquake-responsive fuel shut-off device adapted for insertion in a fuel line connected to a fuel source under pressure comprising:

a main valve and a fluid-pressure-responsive actuator therefor maintaining said valve in fluid flow open position in response to a fuel-line-imposed pressure differential and including means biasing said valve to flow shut-off position in the absence of said differential;

means providing a fluid-line-connected passage to said actuator for placing said line pressure in opposition to and equalizing said pressure differential to effect closing of said valve by said biasing means;

a second valve in said passage movable between open and closed positions and biased for movement to open position;

a pendulum mounted to swing in response to a predetermined severity earthquake; and means connecting said pendulum and second valve and holding the latter in closed position against its bias in an undisturbed pendant position of said pendulum and releasing said second valve upon predetermined displacement of said pendulum to permit movement of said second valve to open position under its bias and consequent closing of said main valve.

3. A device as defined in claim 1, said pendulum having an arm pivotally mounted in spaced relation to an upper end of said arm; and said second valve having a reciprocating part mounted in abutment with and supported on said arm upper end in said undisturbed pendant position of said pendulum to hold said second valve in closed position, said arm end moving in response to a predetermined minimum severity earthquake to release said part.

4. A device as defined in claim 3, said valve part being movable on a vertical axis coincident with the undisturbed vertical axis of said arm and between a relatively elevated closed position of said valve and a lower open position of said valve, said part being normally supported in its elevated position on the upper end face of said arm but in sliding contact therewith, thus permitting arcuate sliding displacement of said face out of supporting contact with said part.

5. A device as defined in claim 4, said end face having a convex form facilitating said sliding engagement.

6. A device as defined in claim 5, and a plurality of members formed for interchangeably mounting on said arm end and providing end faces of different sizes functioning to release said part in response to earth movements of different severities.

* * * * *

UNITED STATES PATENT AND TRADEMARK OFFICE
CERTIFICATE OF CORRECTION

PATENT NO. : 4,094,332
DATED : June 13, 1978
INVENTOR(S) : JOSEPH F. POFF and JERRY W. POFF It is certified that error appears in the above-identified patent and that said Letters Patent are hereby corrected as shown below:

Column 1, line 16, delete "s,158,753" and insert ---2,158,753---; and

Column 1, line 33, delete "wuld" and insert ---would---.

Signed and Sealed this

Fourteenth Day of November 1978

[SEAL]

Attest:

RUTH C. MASON
Attesting Officer

DONALD W. BANNER
Commissioner of Patents and Trademarks